United States Patent

Bales et al.

[11] Patent Number: 6,009,157
[45] Date of Patent: Dec. 28, 1999

[54] AUTOMATIC CALL BACK UNDER CONTROL OF A TELEPHONE TERMINAL

[75] Inventors: Bruce Merrill Bales, Louisville; Stephen Max Thieler, Boulder, both of Colo.

[73] Assignee: Lucent Technologies Inc., Murray Hill, N.J.

[21] Appl. No.: 08/798,768

[22] Filed: Feb. 11, 1997

Related U.S. Application Data

[63] Continuation of application No. 08/362,386, Dec. 22, 1994, abandoned.

[51] Int. Cl.$^6$ .......................... H04M 3/48; H04Q 11/04; H04J 3/12
[52] U.S. Cl. .................. 379/209; 370/259; 370/271; 370/524; 379/230
[58] Field of Search ................... 370/259, 271, 370/522, 524; 379/142, 201, 202, 207, 208, 209, 210, 215, 265, 266, 219, 230; 455/403

[56] References Cited

U.S. PATENT DOCUMENTS

| | | | |
|---|---|---|---|
| 3,707,605 | 12/1972 | Lee, Jr. et al. | 379/209 |
| 3,854,014 | 12/1974 | Akin et al. | 379/209 |
| 3,931,476 | 1/1976 | Matthews | 379/207 X |
| 4,068,101 | 1/1978 | Chemarin | 379/207 |
| 4,139,739 | 2/1979 | von Meister et al. | 379/207 |
| 4,166,929 | 9/1979 | Sheinbein | 379/209 |
| 4,313,035 | 1/1982 | Jordan et al. | 379/207 |
| 4,567,323 | 1/1986 | Lottes et al. | 379/215 |
| 4,723,273 | 2/1988 | Diesel et al. | 379/210 |
| 4,726,054 | 2/1988 | Molnar | 379/230 X |
| 4,764,919 | 8/1988 | Hunter et al. | 370/259 |
| 4,899,374 | 2/1990 | Van Landeghem | 379/215 |
| 4,930,152 | 5/1990 | Miller | 379/214 |
| 4,947,421 | 8/1990 | Toy et al. | 379/215 |
| 5,012,466 | 4/1991 | Buhrke et al. | 370/270 |
| 5,034,975 | 7/1991 | Grimes | 379/142 |
| 5,142,525 | 8/1992 | Nakatsuma | 379/209 |
| 5,155,761 | 10/1992 | Hammond | 379/67.1 X |
| 5,218,632 | 6/1993 | Cool | 379/126 |
| 5,303,301 | 4/1994 | Takahata | 379/209 |
| 5,311,574 | 5/1994 | Livanos | 379/209 |
| 5,394,463 | 2/1995 | Fischell et al. | 379/207 |
| 5,396,548 | 3/1995 | Bayerl et al. | 379/211 |
| 5,406,616 | 4/1995 | Bjorndahl | 455/433 |
| 5,425,091 | 6/1995 | Josephs | 379/209 |
| 5,436,967 | 7/1995 | Hanson | 379/266 |

*Primary Examiner*—Harry S. Hong
*Attorney, Agent, or Firm*—John C. Moran

[57] ABSTRACT

Telephone terminals directly implement an automatic call back feature by establishing a logical channel between two telephone terminals when a calling telephone terminal is unable to complete a call to a called telephone terminal. Via the logical link, the called telephone terminal communicates to the calling telephone terminal any change in state that is related to its ability to receive a call. When both telephone terminals are idle, the calling telephone terminal recalls the called telephone terminal to set up a call. The logical link is established on user-user temporary signaling or D channel facilities of ISDN links. Since the interconnecting networks are not part of providing the automatic call back service, the telephone terminals can be interconnected by any combination of telephone networks that provide ISDN service.

22 Claims, 3 Drawing Sheets

AUTOMATIC CALL BACK UNDER CONTROL OF A TELEPHONE TERMINAL

This application is a continuation of application Ser. No. 08/362,386, filed Dec. 22, 1994, now abandoned.

TECHNICAL FIELD

This invention relates to telecommunication features and, in particular, to providing automatic call back under control of a telephone terminal.

BACKGROUND OF THE INVENTION

The automatic call back feature allows a calling party to actuate a button on the calling telephone terminal when a busy signal is received back from the called telephone terminal. When the called telephone terminal finishes the present call, a call is then set up between the calling telephone terminal and the called telephone terminal. In the prior art, the automatic call back feature has long been provided by customer telecommunications switching systems (often referred to as PBX). However this feature is very complex when provided by a network of customer telecommunication switching systems, since it requires each of the customer telecommunication switching systems to be specially programmed for this feature. Because of this complexity, this feature is not provided across the public telephone network. U.S. Pat. No. 5,012,466 discloses the provision of automatic call back services utilizing a network of telecommunication switching systems. Another such system is set forth in U.S. Pat. No. 4,899,374.

Another method for providing automatic call back is illustrated in U.S. Pat. No. 4,899,374. This discloses the use of a separate control system with a telephone to provide the automatic call back feature. If the user is unable to complete the call when originally dialed, the control system repeatedly tries at predefined intervals to complete the call. The problem with that method is that the control system is repeatedly placing calls thus tying up the telecommunication switching system and further the predefined interval has to be reasonably long to avoid the problem of tying up the telecommunication system. The called party may hang up from one telephone call and start a second telephone call before the control system redials to attempt to do the automatic call back.

The problem of providing automatic call back service becomes even more complex when trying to perform this service for multi-media calls. The method proposed in U.S. Pat. No. 4,899,374 would constantly be utilizing large amounts of bandwidth each time a call was attempted. When the control system attempts to place the call, it needs to request the necessary bandwidth to support a multi-media call. A similar problem exists in U.S. Pat. Nos. 4,899,374 and 5,12,466. In addition, the facilities and bandwidth required for the call when it is finally completed by automatic call back may have changed from when the original call was made. Finally, if the call was made through a combination of private and public networks, providing the call back can be very difficult.

What is needed is the ability to be able to determine when both telephone terminals are idle so that the automatic call back service can be performed without tying up substantial networks facilities in performing the automatic call back service.

SUMMARY OF THE INVENTION

The foregoing problems are solved and a technical advance is achieved by telephone terminals that implement an automatic call back feature by establishing a logical channel between two telephone terminals when a calling telephone terminal is unable to complete a call to a called telephone terminal. The called telephone terminal communicates to the calling telephone terminal any change relating to the ability of the called telephone terminal to receive a call. Advantageously, the logical link is established on ISDN links using user-user temporary signalling or D channel facilities of the ISDN links. Since the interconnecting networks are not part of providing the automatic call back service, the telephone terminals can be interconnected by any combination of telephone networks that provide ISDN service.

DETAILED DESCRIPTION

Figure 1:
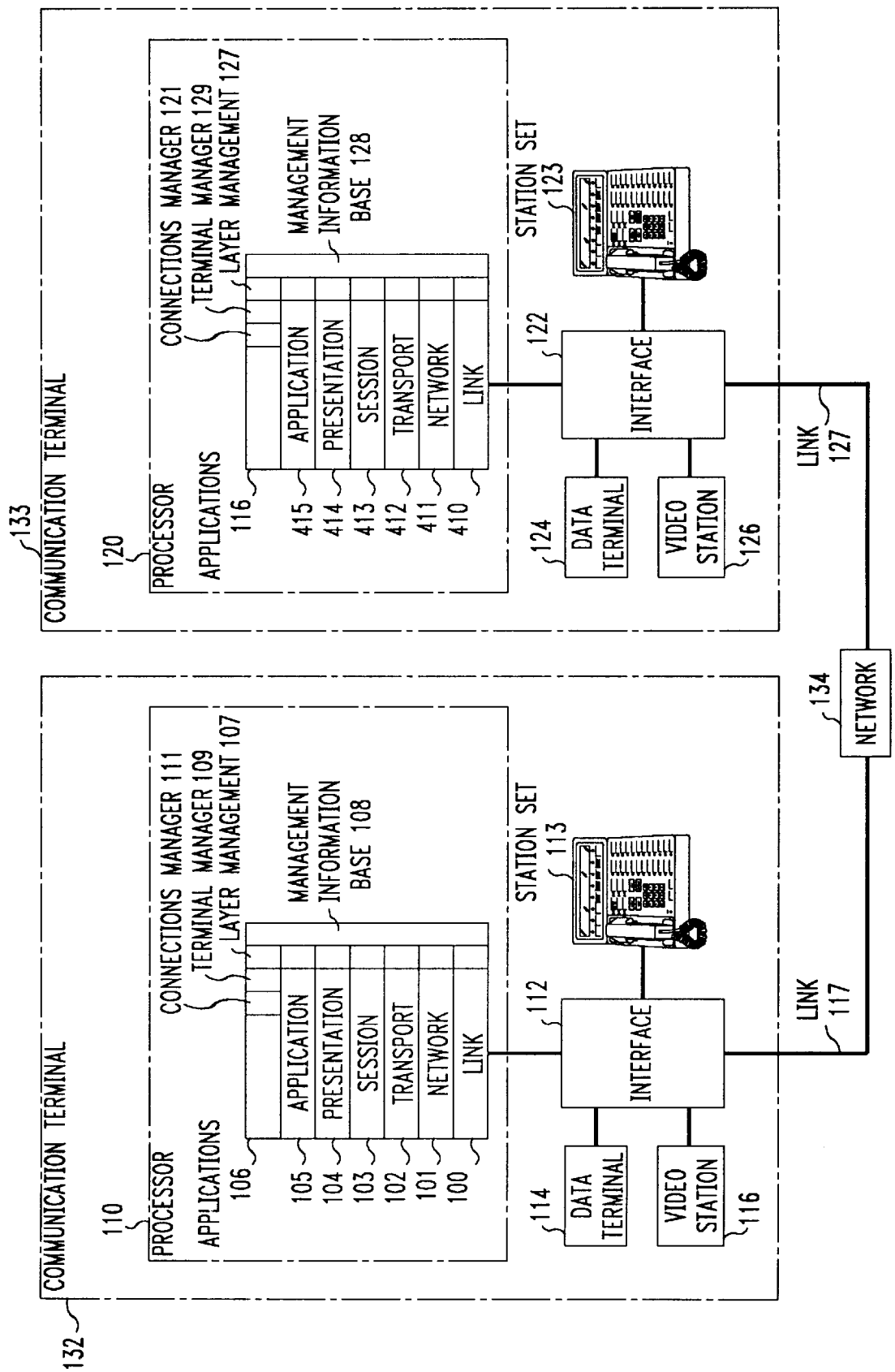
FIG. 1 illustrates a system for implementing the inventive concept.

FIG. 1 illustrates communication terminals 132 and 133 interconnected by network 134 via links 117 and 127, respectively. These links are initially disclosed as BRI links but later these links will be higher bandwidth links. Communication terminal 132 includes processor 110 which performs all control operations. Interface 112 is the physical interface between network 134 and station set 113, data terminal 114, and video station 116. In addition, interface 112 in cooperation with software layer 100 in processor 110 transfers messages to and from software layers 101 though 106 and link 117. Communication terminal 132 is capable of setting up calls that consist of only voice communication involving station set 113, voice and data communication, voice and video communication or voice, data, and video communication. The operation of software layers 100 through 105 is described in detail in U.S. Pat. No. 5,185,742 which is hereby incorporated by reference. Software layers 410 through 415 are similar in operation to software layers 100 through 105. Communication terminal 133 comprises elements 120 through 128 which are identical in operation for the similarly numbered elements described with respect to communication terminal 132.

To understand the present invention consider the following example. Communication terminal 133 is engaged in a call with another communication terminal not illustrated in FIG. 1. Communication terminal 132 places a call to communication terminal 133. The call is initially placed by the transmission of a set up message via link 117 to network 134 by communication terminal 132. In response to the set up message, network 134 transmits a set up message to communication terminal 133. This set up message is processed by software layers 410 through 415 and is finally handled by terminal management application 129. Terminal management application 129 rejects the call by the transmission of a disconnect message back to communication terminal 132. Terminal management 109 displays to the user that the call has been rejected. If the user requests the automatic call back feature, terminal management application 109 requests that a logical link be set up between the two terminal management applications and requests via the logical link that the automatic call back feature be activated by communication terminal 132. The logical link can be set up using user-user temporary signalling connection or it may be set up by utilizing a logically link in the D channels that connect both communication terminals to network 134.

The terminal management application 129 communicates to terminal management application 109 any change that effects the ability of communication terminal 133 to complete a call. For example, if station set 123 becomes busy in communication terminal 133, terminal management 129 communicates this fact to terminal manager 109 via the logical link. This is done so as to avoid attempting to establish a voice, data, or video call from communication terminal 132 to communication terminal 133 if communication terminal 133 is still busy. When both communication terminals are idle, terminal management application 109 sets up a call to communication terminal 133. In addition, terminal management 109 informs terminal management 129 that the call is being set up via the logical link.

In addition, while both terminal management applications are waiting for both communication terminals to be idle, both terminal management applications display on their respective telephones the fact that an automatic call back call is waiting to be established. This is done so as to alert the users of the communication terminals to this fact. Also, the users of station sets 113 and 123 can terminate the automatic call back feature by actuating the automatic call back button on their station set.

Figure 2:
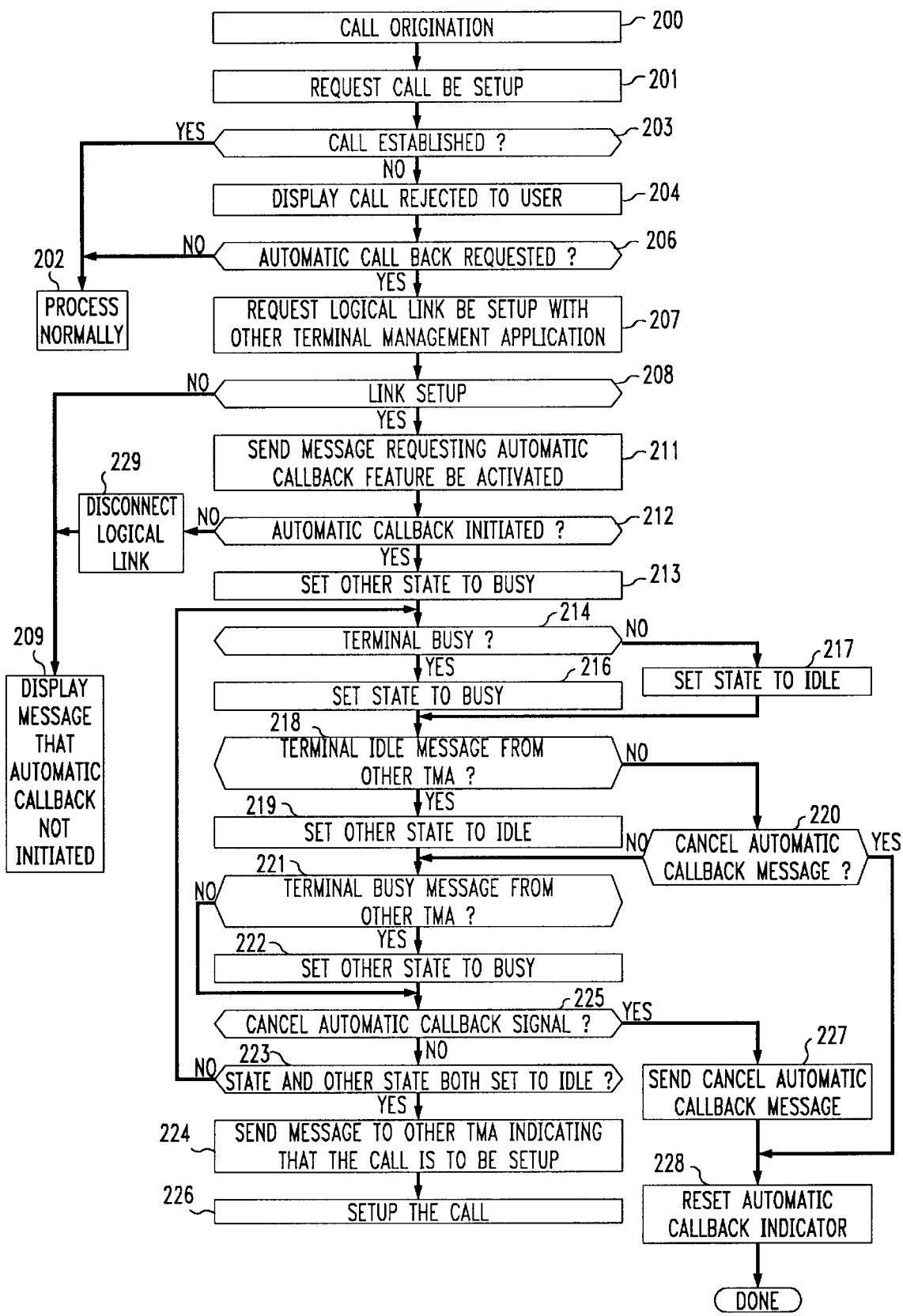
FIG. 2 illustrates, in flow chart form, operations of a telephone terminal initiating an automatic call back feature.

FIG. 2 illustrates, in flow chart form, the operations of a communication terminal that originates a call to another communication terminal. FIG. 2 illustrates the operations for providing the automatic call back feature. In order to make the description more understandable, the previous example is utilized where communication terminal 132 attempted to place a call to communication terminal 133. Upon a call origination operation by station set 113, terminal management application 109 first collects the digits and then sets up a call to the dialed telephone. The call set up is done by sending a set up message to communication terminal 133. If communication terminal 133 is not busy, that terminal responds with a call preceding message followed by an alerting message. If communication terminal 133 is busy, it rejects the call by sending a disconnect message. If the call has been established, terminal management application 109 transfers control to block 202 for normal call processing by execution of decision block 203. If the call has not been established, decision block 203 transfers control to block 204 which displays to the user of communication terminal 132 the fact that the call had been rejected. Decision block 206 then tests to determine if the user has actuated the automatic call back feature button on station set 113. If the answer is no, control is transferred to block 202. If the answer is yes, control is transferred to block 207 which attempts to set up a logical link with terminal management application 129 in communication terminal 133.

After execution of block 207, control is transferred to decision block 208. The latter block determines if a logical link has been set up between terminal management application 109 and terminal management application 129. If the answer is no, control is transferred to block 229 which disconnects the logical link. Next, block 209 displays a message to the user of communication terminal 132 that the automatic call back feature has not been initiated. If the answer in decision block 208 is yes, block 211 is executed which sends a message to terminal management application 129 via the logical link requesting that the automatic call back feature be activated. Control is then transferred to decision block 212 which tests for an automatic call back accepted message which indicates that terminal management application 129 has activated the automatic call back feature.

If the answer in decision block 212 is no, control is transferred to block 229. If the answer is yes, terminal management application 109 executes blocks 213 through 226 are executed to determine when both terminals are idle so that the automatic call back feature can be implemented. In FIG. 2, two words are utilized in these blocks to designate the busy or idle state of the two terminals. The "state" indicates the busy or idle state of communication terminal 132, and the "other state" indicates the busy or idle state of communication terminal 133. Block 213 initially sets the other state to busy since the call had been initially rejected. Decision block 214 determines whether communication terminal 132 is busy. If the answer is yes, state is set to busy by execution of block 216. If the answer is no in decision block 214, the state is set to idle by execution of block 217. Next, decision block 218 is executed to determine if a terminal idle message has been received from terminal management 129. If the answer is yes, the other state is set to idle by execution of block 219 and control is transferred to decision block 218. If the answer in decision block 218 is no, decision block 220 determines if a cancel automatic call back message has been received from terminal management application 129. That message results when the user of station set 123 actuates the automatic call back button after the automatic call back feature has been invoked. If the answer is yes, control is transferred to block 228. If the answer is no, control is transferred to decision block 221.

Decision block 221 tests if a terminal busy message was received from terminal management application 129. If the answer is yes, the other state is set to busy by execution of block 222. Whether the answer is yes or no in decision block 221, control is eventually transferred to decision block 225 which tests if the automatic call back button had been actuated a second time on station set 113. If the answer is yes, control is transferred to block 227 which sends a cancel automatic call back message to terminal management application 129 and releases the logical link. After execution of block 227, control is transferred to block 228 which resets the automatic call back indicator on station set 113. If the answer is no in decision block 225, control is transferred to decision block 223. Decision block 223 tests if both state and other state are set equal to idle . If the answer is no, control is transferred back to decision block 214. If the answer is yes, control is transferred to block 224 which sends a message indicating that the call is going to be set up to terminal management application 129. Block 224 then releases the logical link. After execution of block 224 control is transferred to block 226 for call set up.

Figure 3:
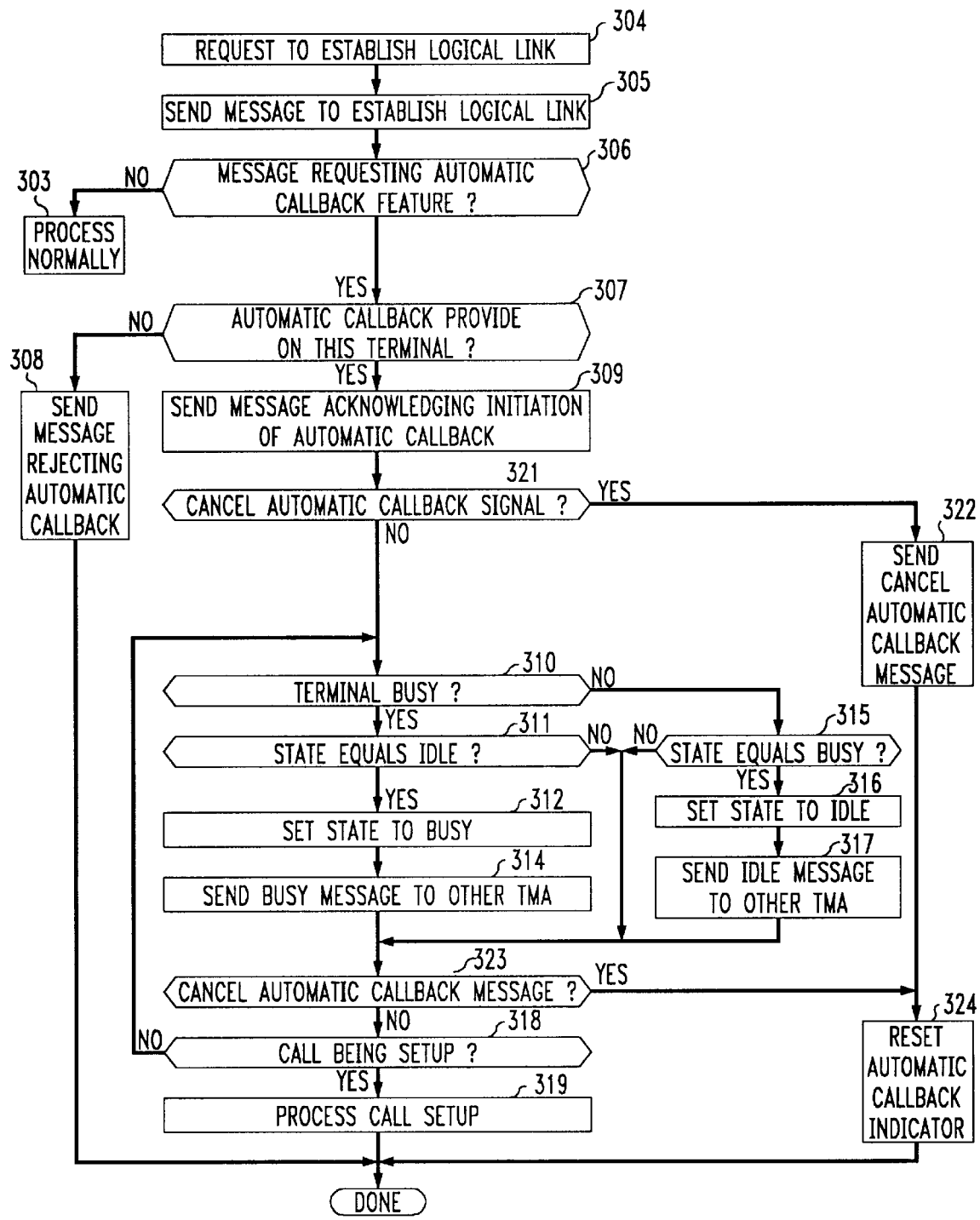
FIG. 3 illustrates, in flow chart form, operations of a telephone terminal that is participating in the automatic call back feature.

FIG. 3 illustrates, in flow chart form, the operations performed by a destination communication terminal in providing the automatic call back feature. In accordance with the present example, this destination communication terminal is communication terminal 133. Block 304 determines when a message is received from the originating terminal, communication terminal 132, requesting the establishment of a logical link. When the message is received, control is transferred to block 305 which sends a message to the lower software layers establishing the logical link back to terminal management 109. Control is then transferred to decision block 306 which awaits a message requesting the initiation of the automatic call back feature. If this message is not received, control is transferred to block 303 which will release the logical link. If the request is received, control is transferred to decision block 307 which determines if the automatic call back feature is provided on this terminal. If the answer to decision block 307 is no, block 308 is executed which sends a message rejecting the request for initiation of the automatic call back feature and releases the logical link. If the answer in decision block 307 is yes, control is transferred to block 309 which sends a message back to terminal management application 109 of communication terminal 132 acknowledging the initiation of the automatic call back feature. Further, block 309 turns on the indicator light associated with the automatic call back button on station set 123.

From block 309, control is transferred to decision block 321 which checks if the automatic call back button has been actuated. The user of communication terminal 133 actuates the automatic call back button to terminate the automatic call back feature. If the answer in decision block 321 is yes, block 322 sends a cancel automatic call back message to terminal management application 109 and passes control to block 324. Block 322 also releases the logical link. Block 324 resets the indicator light associated with the automatic call back button on station set 123.

If the answer in decision block 321 is no, control is transferred to decision block 310. The latter decision block determines if communication terminal 133 is busy. If the answer is yes, decision block 311 determines if the state has been set equal to idle. If the state has been set equal to idle, control is transferred to block 312 which sets the state to busy, and block 314 then sends a terminal busy message to terminal management application 109 of communication terminal 132. For this example, terminal management application 109 is the other terminal management application. After execution of block 314, control is transferred to decision block 323. Decision block 323 tests if a cancel automatic call back message has been received from terminal management application 109. If the answer is no, control is transferred to decision block 318. If the answer is yes, control is transferred to block 324. Returning to decision block 311, if the answer is no, control is transferred to decision block 323.

Returning to decision block 310, if the terminal is idle, control is transferred to decision block 315 which determines if the state has been set equal to busy. If the answer is yes, block 316 sets the state to idle, and block 317 transmits a terminal idle message to terminal management application 109. From block 317, control is transferred to decision block 323. Returning to decision block 315, if the answer is no, control is transferred to decision block 323. Decision block 318 checks to see if a call is being set up message has been received from terminal management application 109. If the answer is yes, block 319 is executed to await the processing of a call set up message. If the answer in decision block 318 is no, control is transferred to 310.

It is to be understood that the above-described embodiment merely is illustrative of the principles of the invention and that arrangements may be devised by those skilled in the art without departing from the spirit and scope of the invention.

We claim:

1. A method for providing an automatic call back feature by a calling communication terminal, comprising the steps of:

establishing a logical link to a called communication terminal by a calling communication terminal upon a first call to the called communication terminal being rejected by the called communication terminal; and setting up a second call to the called communication terminal by the calling communication terminal upon receipt of a first message via the logical link from the called communication terminal defining that the called communication terminal is idle.

2. The method of claim 1 further comprises the step of receiving a second message from the called communication terminal by the calling communication terminal via the logical link upon the called communication terminal becoming busy.

3. The method of claim 2 wherein the step of setting up comprises the step of determining that both the called communication terminal and calling communication terminal are idle before setting up the second call.

4. The method of claim 3 wherein the step of establishing comprises the step of determining that a user of the calling communication terminal is requesting the automatic call back feature be initiated.

5. The method of claim 4 wherein the step of establishing further comprises the step of indicating to the user of the calling communication terminal that the automatic call back feature has been initiated.

6. The method of claim 4 further comprises the step of indicating to a user of the called communication terminal that the automatic call back feature has been initiated.

7. The method of claim 5 further comprises the step of terminating the automatic call back feature upon receipt of a third message by the calling communication terminal from the called communication terminal.

8. The method of claim 7 further comprises the step of transmitting the third message by the called communication terminal in response to a request by the user of the called communication terminal.

9. The method of claim 5 further comprises the step of terminating the automatic call back feature upon an action of the user of the calling communication terminal requesting termination.

10. The method of claim 7 wherein the calling communication terminal and the called communication terminal are interconnected by a telecommunication switching system that is responsive to ISDN signaling and the step of establishing further comprises the step of using user-user temporary signaling to establish the logical link via the telecommunication switching system.

11. The method of claim 7 wherein the calling communication terminal and the called communication terminal are interconnected by a telecommunication switching system that is responsive to ISDN signaling and the step of establishing further comprises the step of using a logical link in a D channel to establish the logical link via the telecommunication switching system.

12. An apparatus for providing an automatic call back feature by a calling communication terminal, comprising:

means for establishing a logical link to a called communication terminal by a calling communication terminal upon a first call to the called communication terminal being rejected by the called communication terminal; and means for setting up second call to the called communication terminal by the calling communication terminal upon receipt of a first message via the logical link from the called communication terminal defining that the called communication terminal is idle.

13. The apparatus of claim 12 further comprises means for receiving a second message from the called communication terminal by the calling communication terminal via the logical link upon the called communication terminal becoming busy.

14. The apparatus of claim 13 wherein the means for setting up comprises means for determining that both the called communication terminal and calling communication terminal are idle before setting up the second call.

15. The apparatus of claim 14 wherein the means for establishing comprises means for determining that a user of the calling communication terminal is requesting the automatic call back feature be initiated.

16. The apparatus of claim 15 wherein the means for establishing further comprises means for indicating to the user of the calling communication terminal that the automatic call back feature has been initiated.

17. The apparatus of claim 15 further comprises means for indicating to a user of the called communication terminal that the automatic call back feature has been initiated.

18. The apparatus of claim 16 further comprises means for terminating the automatic call back feature by the calling communication terminal upon receipt of a third message from the called communication terminal.

19. The apparatus of claim 18 further comprises means for transmitting the third message by the called communication terminal in response to a request by the user of the called communication terminal.

20. The method of claim 16 further comprises the step of terminating the automatic call back feature upon an action of the user of the calling communication terminal requesting termination.

21. The apparatus of claim 18 wherein the calling communication terminal and the called communication terminal are interconnected by a telecommunication switching system that is responsive to ISDN signaling and the means for establishing further comprises means for using user-user temporary signaling to establish the logical link via the telecommunication switching system.

22. The apparatus of claim 18 wherein the calling communication terminal and the called communication terminal are interconnected by a telecommunication switching system that is responsive to ISDN signaling and the means for establishing further comprises means for using a logical link in a D channel to establish the logical link via the telecommunication switching system.

* * * * *